United States Patent
Yatagai et al.

(10) Patent No.: US 6,973,985 B2
(45) Date of Patent: Dec. 13, 2005

(54) SNOW VEHICLE

(75) Inventors: Yasuaki Yatagai, Hamamatsu (JP); Takashi Nishihara, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 10/806,823

(22) Filed: Mar. 23, 2004

(65) Prior Publication Data

US 2004/0188159 A1     Sep. 30, 2004

(30) Foreign Application Priority Data

Mar. 28, 2003   (JP)   .............................. 2003-091438

(51) Int. Cl.$^7$ ............................................. B60K 11/00
(52) U.S. Cl. .................................... 180/68.2; 180/190
(58) Field of Search ................................ 180/182, 190, 180/68.1, 68.2

(56) References Cited

U.S. PATENT DOCUMENTS

| | | | | |
|---|---|---|---|---|
| 5,117,932 A | * | 6/1992 | Kurosu et al. | 180/68.2 |
| 5,152,255 A | * | 10/1992 | Fukuda | 123/41.33 |
| 5,251,718 A | * | 10/1993 | Inagawa et al. | 180/190 |
| 5,279,381 A | * | 1/1994 | Fukuda | 180/190 |
| 6,227,323 B1 | * | 5/2001 | Ashida | 180/190 |
| 6,651,765 B1 | * | 11/2003 | Weinzierl | 180/190 |
| 2002/0027029 A1 | * | 3/2002 | Yayagai et al. | 180/182 |
| 2002/0153182 A1 | * | 10/2002 | Vaillancourt et al. | 180/68.1 |

FOREIGN PATENT DOCUMENTS

| | | |
|---|---|---|
| JP | 8-091277 A | 4/1996 |
| JP | 2001-214750 A | 8/2001 |

* cited by examiner

*Primary Examiner*—Kevin Hurley
(74) *Attorney, Agent, or Firm*—Frishauf, Holtz, Goodman & Chick, P.C.

(57) ABSTRACT

A snow vehicle which is capable of increasing the cooling efficiency of an intercooler thereof by reducing the influence of intense heat from a supercharger thereof, while suppressing the overall height of an engine thereof. An engine hood covers a front part of the body frame from above, and an engine room is formed under the engine hood. A supercharger is disposed in the engine room at a location forward of the engine, and an intercooler is disposed rightwardly of the engine. High-temperature air from the supercharger is cooled by the intercooler and supplied to the engine. An air inlet port is formed through a front left half of the engine hood, for taking in air for cooling the supercharger etc., and another air inlet port is formed through a front right half of the engine hood separately from the air inlet port, for taking in air for cooling mainly the intercooler and a battery.

7 Claims, 6 Drawing Sheets

SNOW VEHICLE

BACKGROUND OF THE INVENTION

1. Field of the Invention

The present invention relates to a snow vehicle with a four-cycle engine installed thereon.

2. Description of the Related Art

Conventionally, two-cycle engines have been dominant as engines installed on snow vehicles, because of their relatively simple construction, lightweight, compact size, and high output power. However, more and more four-cycle engines have come to be used for snow vehicles due to the restrictions on exhaust emissions and demand for improved fuel economy in recent years. The four-cycle engines are more complicated in construction than the two-cycle engines, and therefore require a large installation space within the engine room. Further, in a vehicle where a supercharger (turbocharger) and an intercooler as an auxiliary associated therewith are installed, the installation space within the engine room becomes more limited, and the overall height of the engine tends to be increased.

In a snow vehicle in general, an engine room is defined inside an engine hood in front of a handle bar, and an engine is accommodated in the engine room. Further, a headlight is disposed in the vicinity of the handle bar. For this arrangement, the engine hood is shaped e.g. such that it slopes down toward the front from its highest point immediately below the headlight. Therefore, to save space, various component parts need to be efficiently laid out in the limited space within the engine room.

To suppress the overall height of the engine, it has been proposed to dispose a supercharger in front of the engine e.g. by Japanese Laid-Open Patent Publication (Kokai) No. 2001-214750(first prior art snow vehicle).

When the supercharger is installed to suppress the overall height of the engine, as in the case of the first prior art snow vehicle, the engine room is so crowded with components parts that cooling air does not flow smoothly within the engine room. Further, when the supercharger is disposed in front of the engine, there is a fear of intense heat from the supercharger affecting component parts disposed rearwardly of the supercharger.

For vehicles without a supercharger installed thereon, there has also been proposed, e.g. by Japanese Laid-Open Patent Publication (Kokai) No. H08-91277 (second prior art snow vehicle), a technique of enhancing cooling efficiency by separating a muffler section and the cooling system of an engine from each other using a partition that separates between a muffler room and an engine room.

When a supercharger and an intercooler are installed, however, while the supercharger generates intense heat, the intercooler needs to have high cooling efficiency. What is more, a clutch mechanism, a muffler, and so forth are also heat sources, and hence, how to form streams of cooling air is an important factor to be considered in designing the layout of the interior of the engine room, to ensure sufficient cooling efficiency of the intercooler.

Further, it is also necessary to consider the locations of component parts, such as a battery, which should not be exposed to intense heat. Furthermore, the number of component parts that generate heat within the engine room tends to increase, as can be understood from the example of installation of the turbocharger. Therefore, there is room for considering the way to make effective use of warm air which has been heated when passing through the engine room.

SUMMARY OF THE INVENTION

It is a first object of the present invention to provide a snow vehicle which is capable of increasing the cooling efficiency of an intercooler thereof by reducing the influence of intense heat from a supercharger thereof, while suppressing the overall height of an engine thereof.

It is a second object of the present invention to provide a snow vehicle which is capable of increasing the cooling efficiency of an intercooler thereof and at the same time preventing a battery thereof from being heated to a high temperature, by reducing the influence of intense heat from a supercharger thereof, while suppressing the overall height of an engine thereof.

It is a third object of the engine to provide a snow vehicle which is capable of preventing a running board thereof from being frozen, by making effective use of air used for cooling the engine room.

To attain the above first object, in a first aspect of the present invention, there is provided a snow vehicle comprising a vehicle body having a front part, an engine hood provided at the front part of the vehicle body, an engine room formed under or below the engine hood, a four-cycle engine accommodated in the engine room, a supercharger disposed in the engine room at a location forward of the four-cycle engine, an intercooler for cooling air supplied from the supercharger to the four-cycle engine, a first air inlet port formed through the engine hood, for taking in air for cooling the supercharger, and a second air inlet port formed through the engine hood separately from the first air inlet port, for taking in air for cooling the intercooler.

Preferably, the snow vehicle further comprises a guide for guiding the air taken in through the second air inlet port to the intercooler.

More preferably, at least part of the guide is formed integrally with the engine hood.

Preferably, the snow vehicle further comprises a partition, and a first air flow path formed through the engine room such that the air taken in through the first air inlet port flows therein and a second air flow path formed through the engine room such that the air taken in through the second air inlet port flows therein are substantially partitioned by the partition.

Preferably, the snow vehicle further comprises a first air exhaust port for exhausting mainly the air taken in through the first air inlet port, and a second air exhaust port for exhausting mainly the air taken in through the second air inlet port, and wherein the engine room has a rear end, and the first air exhaust port and the second air exhaust port are disposed separately from each other at or in a vicinity of the rear end of the engine room.

More preferably, the vehicle body has left and right sides opposite to each other in a transverse direction thereof, and the snow vehicle further comprising left and right running boards disposed at the left and right sides of the vehicle body, respectively, the first and second air exhaust ports being directed toward the left and right running boards, respectively, such that air is exhausted through the first and second air exhaust ports toward the left and right running boards, respectively.

More preferably, the intercooler is held in a position in which the intercooler has a maximum cross-sectional area along a plane perpendicular to the second air flow path.

To attain the above second object, in a second aspect of the present invention, there is provided a snow vehicle comprising a vehicle body having a front part, an engine hood provided at the front part of the vehicle body, an engine room formed under or below the engine hood, a four-cycle engine accommodated in the engine room, a supercharger disposed in the engine room at a-location forward of the four-cycle engine, an intercooler for cooling air supplied from the supercharger to the four-cycle engine, an air flow path-forming mechanism for taking air into the engine room from outside, and forming an air flow path for the taken-in air such that the taken-in air cools the intercooler, and a battery disposed in the air flow path formed by the air flow path-forming mechanism at a location downstream of the intercooler, wherein the supercharger is disposed in the engine room at a location outside the air flow path formed by the air flow path-forming mechanism, and the air having cooled the intercooler cools the battery.

Preferably, the engine hood has a front part, the engine room has a rear end, and the air flow path-forming mechanism comprises at least an air inlet port formed through the front part of the engine hood, and an air exhaust port formed in a vicinity of the rear end of the engine room, for exhausting the air having cooled the intercooler and the battery.

To attain the above third object, in a third aspect of the present invention, there is provided a snow vehicle comprising a vehicle body having a front part, and left and right sides opposite to each other in a transverse direction thereof, an engine hood provided at the front part of the vehicle body, an engine room formed under or below the engine hood, the engine room having a rear end, a four-cycle engine accommodated in the engine room, left and right running boards disposed at the left and right sides of the vehicle body, at least one air intake port formed through the engine hood for taking air into the engine room, and first and second air exhaust ports provided in a vicinity of the rear end of the engine room, such that the first and second air exhaust ports are directed toward the left and right running boards, for exhausting air which is taken into the engine room through the air inlet port, whereby the air which is taken into the engine room is exhausted through the first and second air exhaust ports toward the left and right running boards, respectively.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing a preferred embodiment thereof.

Figure 1:
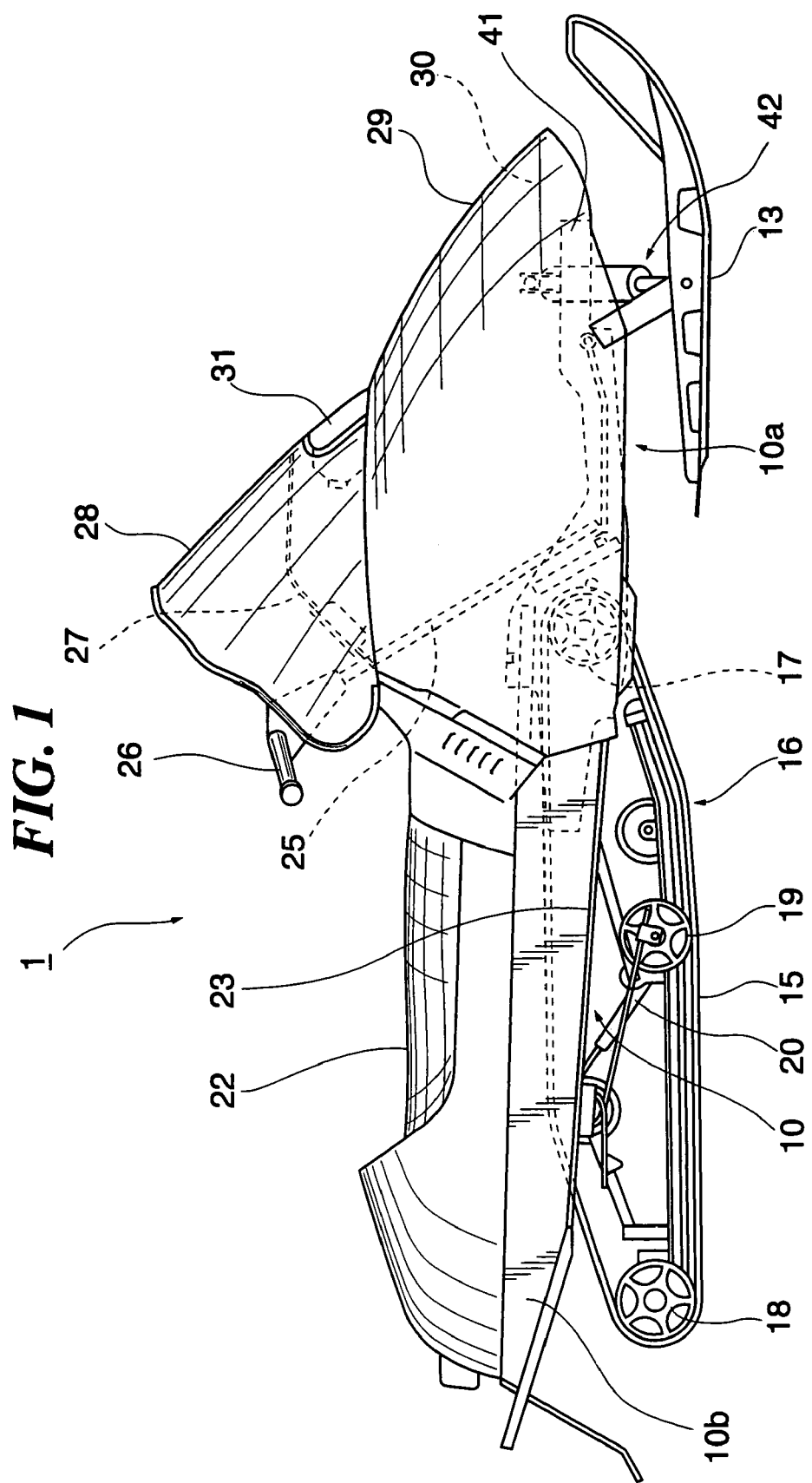
FIG. 1 is a side view showing a snow vehicle according to an embodiment of the present invention.
Figure 2:
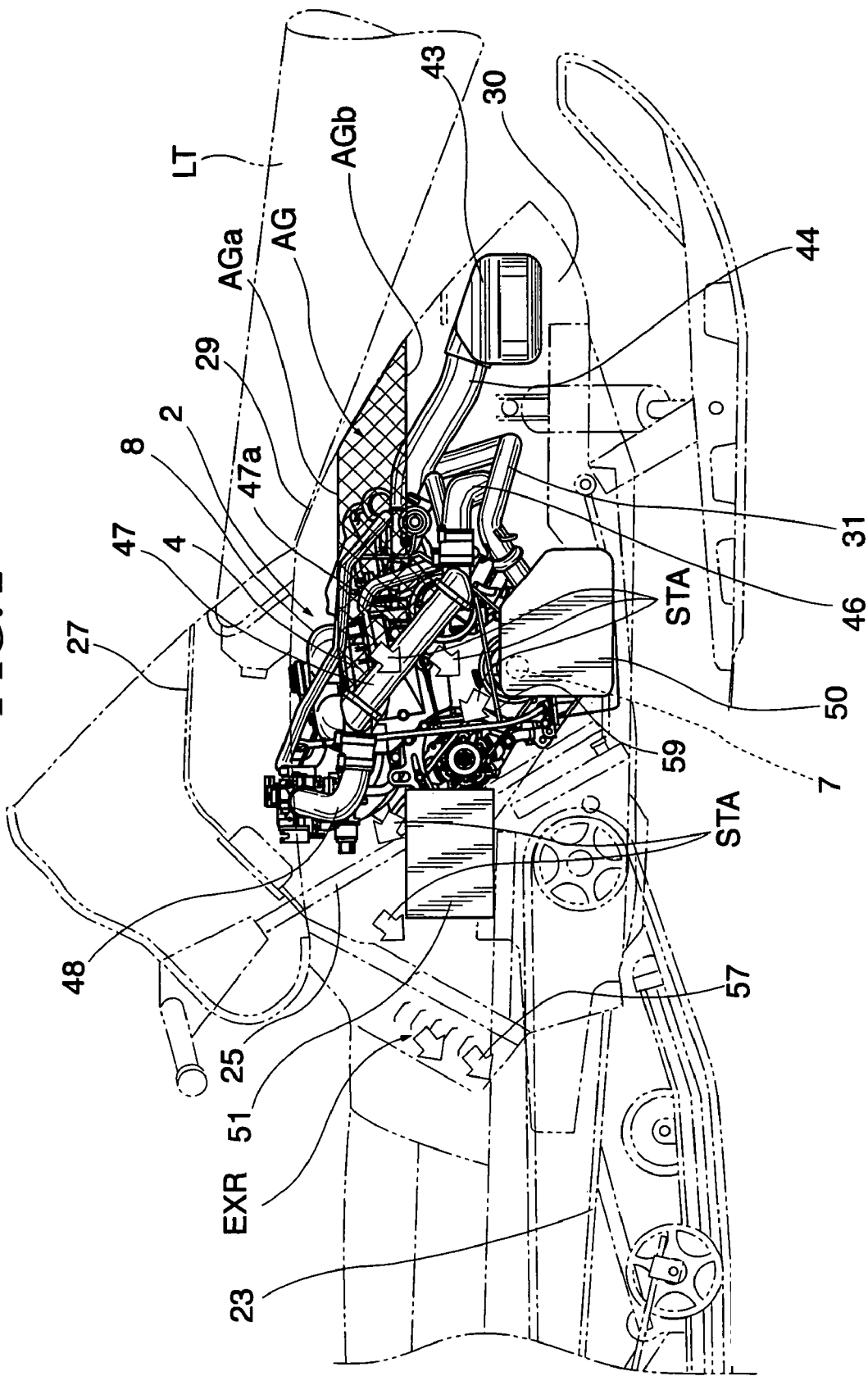
FIG. 2 is a perspective view showing the interior of an engine room as viewed from a lateral side of the vehicle.
Figure 3:
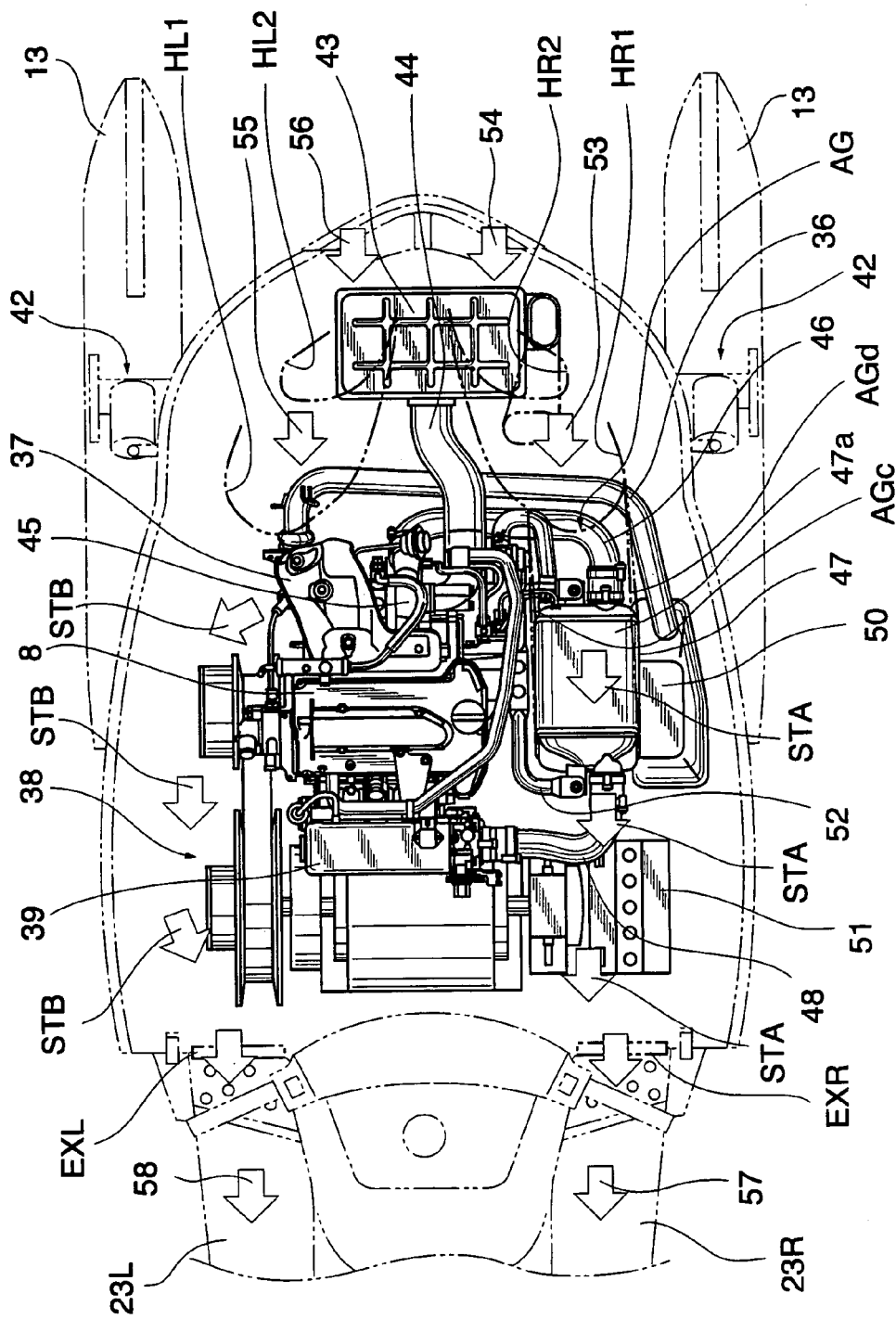
FIG. 3 is a perspective view showing the interior of the engine room as viewed from the top side of the vehicle.
Figure 4:
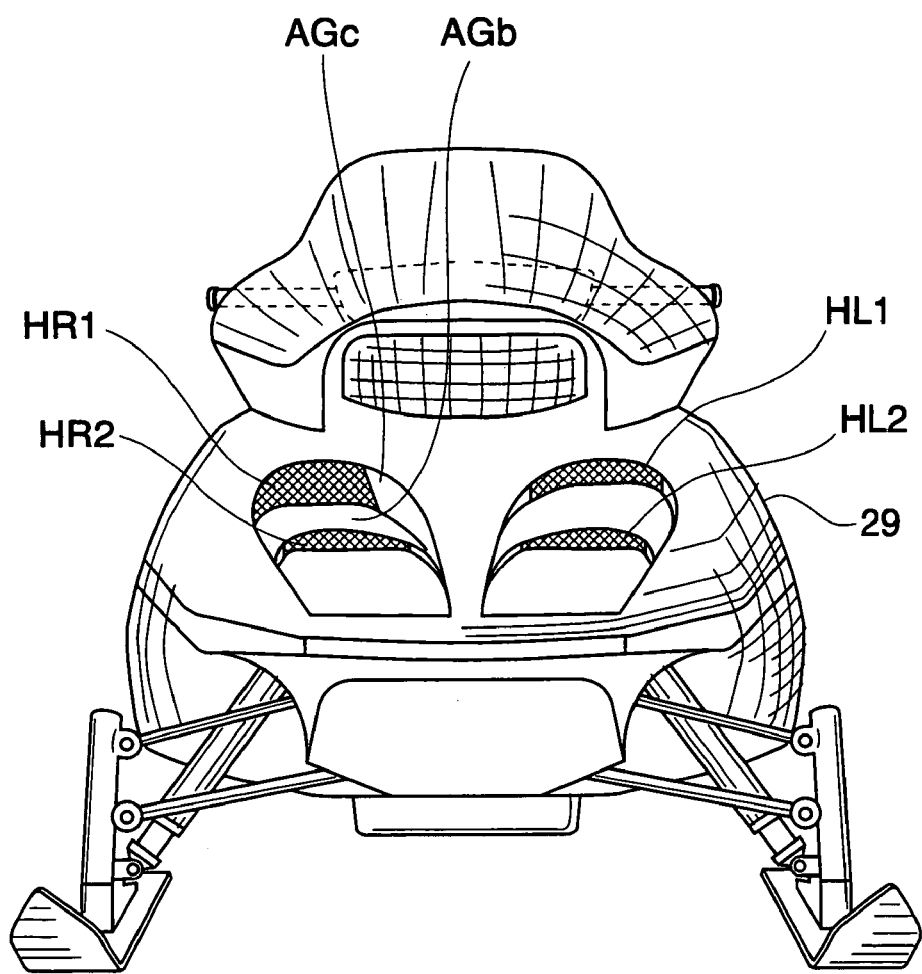
FIG. 4 is a front view showing the vehicle.

FIG. 1 is a side view showing a snow vehicle according to an embodiment of the present invention. FIG. 2 is a perspective view showing the interior of an engine room as viewed from a lateral side of the vehicle. FIG. 3 is a perspective view showing the interior of the engine room as viewed from the top side of the vehicle. FIG. 4 is a front view showing the vehicle.

The snow vehicle 1 has a three-cylinder four-cycle engine (hereinafter simply referred to as "the engine") 2 installed in an engine room 30, referred to hereinafter. In the following description, the terms related to the "front", "rear", "left", and "right" of the snow vehicle (snowmobile) 1 will be used as having respective meanings defined with reference to the position of a driver on a driver's seat.

First, a description will be given of the whole arrangement of the snow vehicle 1.

Referring to FIG. 1, the snow vehicle 1 includes a body frame 10 extending in forward and rearward directions or running direction of the vehicle 1, a pair of left and right steering sleds 13 horizontally movably disposed under a front part (hereinafter referred to as "the front frame section") 10a of the body frame 10, and a driving crawler 16 for circulating a track belt 15 disposed under a rear part ((hereinafter referred to as "the rear frame section") 10b of the body frame 10. The front frame section 10a corresponds to a body front part, and is also referred to as "the engine mount frame". The crawler 16 includes a drive wheel 17 disposed at a front end of the rear frame section 10b, a driven wheel 18 disposed at a rear end of the rear frame section 10b, a plurality of intermediate wheels 19, a suspension mechanism 20 that suspends and cushions these components, and the track belt 15 stretched over the wheels for turning around them.

The body frame 10 has a monocock structure, and the front frame section 10a in which the engine 2 is installed is shaped generally as a boat bottom which progressively narrows toward the front in plan view, with an open top, and the front frame section 10a is covered with an engine hood 29 from above.

The front frame section 10a has a front part thereof formed as a sled housing section 41 protruding upward. The sled housing section 41 accommodates a suspension and steering mechanism 42. Further, a track housing, not shown, that accommodates a front part (above the drive wheel 17) of the crawler 16, is formed continuously and integrally with the rear frame section 10b.

The rear frame section 10b also plays the role of a cover accommodating the whole crawler 16 as viewed from above. A cradle-shaped seat 22 is disposed above the rear frame section 10b, and on opposite lateral sides of the seat 22, there are provided running boards 23 (left and right running boards 23L and 23R) which are one step lower than the seat 22. At an approximately central location in the transverse direction of the vehicle body between the seat 22 and the front frame section 10a, a steering post 25 extends vertically aslant, and a steering bar or handle bar 26 horizontally extends from the upper end of the steering post 25 in the transverse direction. The steering sleds 13 are operated via the steering post 25 by the steering bar 26.

In the vicinity of the steering bar 26 and in front thereof, an instrument panel 27 is provided. Further, a wind shield 28 extends aslant in front of the instrument panel 27 with its upper edge rearwardly located so as to cover the front side of the instrument panel 27 over the entire transverse size thereof. The engine hood 29 gently slopes down in generally streamlined fashion and is shaped generally as a boat bottom upside down. In the vicinity of a stepped border between the engine hood 29 and the instrument panel 27, a headlight 31 is disposed for illuminating ahead of the vehicle. The engine room 30 is defined under the instrument panel 27 and the engine hood 29 thus arranged.

As shown in FIGS. 3 and 4, the engine hood 29 is formed therein with air inlet ports HR1, HR2, HL1, and HL2. The air inlet port HL1 forms a first air inlet port, and the air inlet port HR1 forms a second air inlet port, for allowing outside air to be taken into the engine room 30. As shown in FIG. 2, an air guide AG (guide section) AG is formed integrally with the engine hood 29. Further, left and right air exhaust ports (first and second air exhaust ports) EXL and EXR are arranged in the vicinity of a rear end of the engine room 30, for exhausting air taken into the engine room 30. The air exhaust ports EXL and EXR are formed through the body frame 10 in communication with the engine room 30. Details of these parts will be described in detail hereinafter.

Next, a description will be given of the construction of the engine 2 installed in the engine room 30.

Referring to FIG. 2, the engine 2 is a three-cylinder four-cycle engine with cylinder heads 4 thereof located on a top side thereof, and is disposed close to a lower part of the steering post 25. The engine 2 has a crankshaft 7 extending substantially in parallel with the transverse direction of the vehicle body, and is disposed with the cylinder heads 4 tilted rearward. With this disposition, the overall height of the engine is suppressed so that the engine hood 29 does not block illumination light path LT from the headlight 31.

As shown in FIG. 3, a clutch mechanism 38 is disposed at a location leftward of the crank crankshaft 7 (see FIG. 2) and in a left side part of the engine room 30. The clutch mechanism 38 is implemented e.g. by a V-belt continuously variable transmission with a centrifugal clutch incorporated therein, and is configured to transmit a driving force to the track belt 15 via its gears on the driven side.

At a location in the upper part of the engine 2 and rearward of the head cover 8, there is disposed an intake manifold 39. An exhaust manifold cover 37 is disposed at a left and front portion of the engine 2, and a supercharger (turbocharger) 45 is disposed in the engine room 30 at a location below the exhaust manifold cover 37 and slightly toward the left side of the engine room 30. By disposing the supercharger 45 at a location in front of the engine 2 and below the cylinder heads 4, the overall height of the engine is suppressed. An air cleaner box 43 is disposed in the engine room 30 at an approximately central location of a foremost part thereof in the transverse direction of the vehicle body, and an intercooler 47 is disposed in the engine room 30 at a location rightward of the engine 2 and toward the right side of the engine room 30. The intercooler 47 is fixed to the engine 2 via a mount bracket 52, whereby it is not affected by the deformation of the body frame 10.

The air cleaner box 43 and the supercharger 45 (exactly, the compressor housing of the supercharger 45) are connected by an intake passage 44, and the supercharger 45 and the intercooler 47 are connected by an intake passage 46. The intercooler 47 and the intake manifold 39 are connected by an intake passage 48. Air introduced from the air cleaner box 43 is compressed by the supercharger 45, and the air heated to a high-temperature is cooled by the intercooler 47, and supplied to the cylinders within the engine 2 via the intake manifold 39.

Further, the supercharger 45 (exactly, the turbine housing of the supercharger 45) is communicated with an exhaust muffler 50 via an exhaust passage 36. The exhaust muffler 50 is disposed in the lowest part of the engine room 30 at a location rightward of the engine 2 and toward the right side of the engine room 30, particularly, below the intercooler 47 (see FIG. 2). Exhaust gases from the exhaust muffler 50 are discharged downwardly of the vehicle body via an exhaust pipe, not shown. Further, a battery 51 is disposed in the engine room 30 at a location rearward of the intercooler 47, approximately at the same level as the intercooler, and toward the right side of the engine room 30. The battery 51 is fixed e.g. to the track housing, not shown.

The relationship in level between the above-described components is as follows: The supercharger 45, the intercooler 47, and the battery 51 are disposed approximately at the same level, and arranged at respective intermediate and upper locations in the vertical direction of the engine room 30. On the other hand, the clutch mechanism 38 and the exhaust manifold 50 are disposed approximately at the same level, and arranged at respective locations lower than the intermediate point in the vertical direction of the engine room 30 and close to the bottom of the frame front section 10*a*. The air cleaner box 43 is located at an intermediate level between the above mentioned two heights.

Next, a description will be given of how paths of air streams are formed through the engine room 30.

As shown in FIGS. 3 and 4, the air intake ports HR1 and HR2 are formed through a front right half of the engine hood 29, and the lower air intake port HR2 is used exclusively for taking air into the air cleaner box 43. Outside air (incoming air 54) is efficiently guided from the air intake port HR2 to the air cleaner 43 by a guide member, not shown.

The upper air intake port HR1 is used mainly for cooling the intercooler 47 and the battery 51. As shown in FIGS. 2 and 3, the air guide AG is formed by a top wall AGa, a bottom wall AGb, a left side wall (partition) AGc, and a right side wall AGd, and the walls AGa to AGd are configured such that they extend rearward from the air intake port HR1 as the start point. That is, the air guide AG has a shape generally rectangular in cross section, and has its air inlet opening defined by the air inlet port HR1.

The intercooler 47 has a generally rectangular shape in plan view, and is disposed such that one side 47*a* thereof having a wider area faces aslant, i.e. upward and forward. The air guide AG is formed such that the bottom wall AGb has a rear part thereof slightly lowering, and the air guide AG has a rear end portion thereof opening into the engine room 30 and having a shape generally matching the contours of the intercooler 47 in plan view. This maximizes the cross-sectional area of the intercooler 47 along the plane perpendicular to the flow path of air flowing through the air guide AG into the engine room 30, whereby the cooling efficiency of the intercooler 47 is increased.

On the other hand, as shown in FIGS. 3 and 4, the air intake ports HL1 and HL2 are formed through a front left half of the engine hood 29. The upper air intake port HL1 is used for cooling mainly component parts located in the upper half of the engine room 30, such as the supercharger 45 and component parts in the vicinity thereof (except the intercooler 47 and the battery 51). The lower air intake port HL2 is provided for cooling mainly component parts located in the lower half of the engine room 30, such as the clutch mechanism 38 and the exhaust muffler 50. The air intake ports HL1 and HL2 can be formed as a single air inlet port, for cooling a wide range of component parts except the intercooler 47 and the battery 51. However, in the present embodiment, by dividing the air intake port into upper and lower ones, the cooling air is positively and efficiently guided toward the supercharger 45 which particularly generates intense heat.

As shown in FIG. 3, the air exhaust ports EXL and EXR are arranged in a manner corresponding to the running boards 23L and 23R, respectively. That is, the air exhaust ports EXL and EXR are directed toward the air running boards 23L and 23R, to exhaust air toward the upper surfaces of the running boards 23L and 23R. This causes air warmed in the engine room 30 to warm the running boards 23, thereby preventing the running boards 23 from being frozen.

Further, as shown in FIG. 2, a heat insulating plate 59 which is heat resistant is disposed between the intercooler 47 and the exhaust muffler 50.

Figure 5:
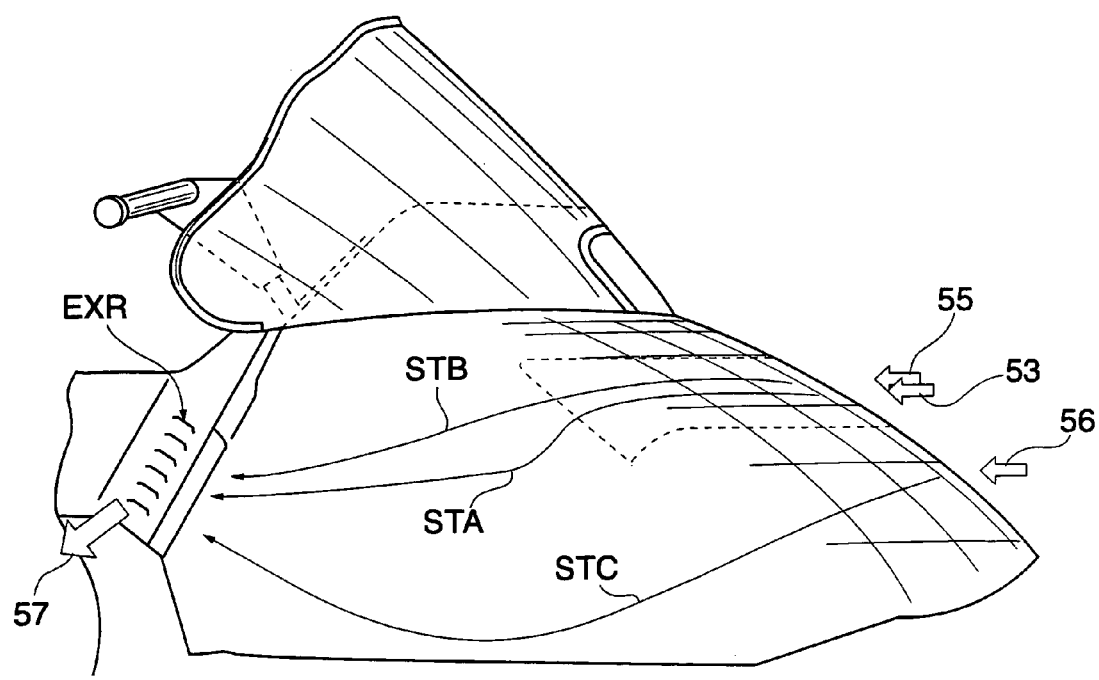
FIG. 5 is a schematic view showing air flow paths formed through the engine room, as viewed from the lateral side of the vehicle.
Figure 6:
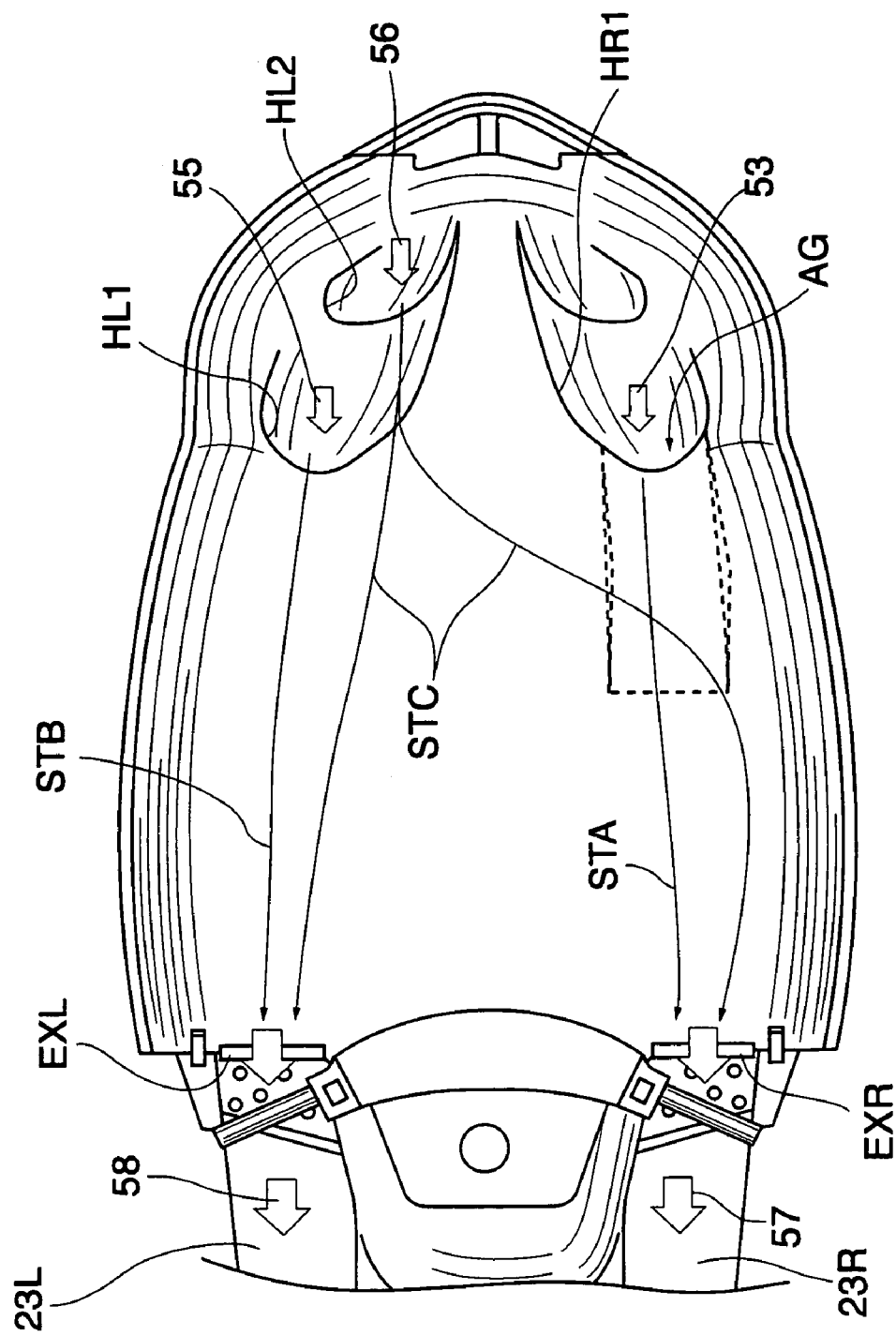
FIG. 6 is a schematic view showing air flow paths formed through the engine room, as viewed from the top side of the vehicle.

With the above described arrangement, in the engine room 30, streams of cooling air are formed as described below. FIG. 5 is a schematic view showing air flow paths formed through the engine room 30, as viewed from a lateral side of the vehicle. FIG. 6 is a schematic view showing the air flow paths formed within the engine room 30, as viewed from the top side of the vehicle.

First, as shown in FIGS. 3, 5 and 6, a flow path (second air flow path) STA is formed from the air inlet port HR1 to the air exhaust port EXR along the right side of the upper half of the engine room 30. That is, running wind enters the engine room 30 as an incoming air stream 53 via the air intake port HR1, which flows through the air guide AG to cool the intercooler 47 and then cool the battery 51, and the resulting warmed air is exhausted as an exhaust air stream 57 toward the running board 23R from the air exhaust port EXR.

Also, a flow path (first air flow path) STB is formed from the air inlet port HL1 to the air exhaust port EXL mainly along the left side of the upper half of the engine room 30. That is, running wind enters the engine room 30 as an incoming air stream 55 via the air inlet port HL1, which mainly cools the supercharger 45, and then most of the air stream 55 is exhausted as an exhaust air stream 58 toward the running board 23L through the air exhaust port EXL.

Further, a flow path STC is formed from the air inlet port HL2 to the air exhaust port EXL and the air exhaust port EXR, mainly in the lower half of the engine room 30. That is, running wind enters the engine room 30 via the air inlet port HL2 as an incoming air stream 56, which mainly cools the clutch mechanism 38 located in a left part of the engine room 30 and the exhaust muffler 30 located in a right part of the same, and then is exhausted as exhaust air streams 58 and 57 toward the upper surfaces of the steps 23L and 23R.

Here, the flow path STA is partitioned from the flow paths STB and STC by the air guide AG. Further, the heat insulating plate 59 also plays the role of guiding an air stream in the flow path STA, thereby partitioning a portion of the flow path STA rearward of the intercooler 47 from the flow path STC.

With the above arrangement, the incoming air stream 53, which is cool, is directly guided to the intercooler 47, and at the same time, heat from the flow paths STB and STC is prevented from affecting the intercooler 47. More specifically, component parts forming heat sources, such as the clutch mechanism 38 and the exhaust muffler 50, are arranged along the flow paths STB and STC. On the other hand, the cooled intercooler 47 exerts influence on the engine output. In view of these, the air flow paths are positively separated from each other to minimize the influence of the above-mentioned heat sources upon the intercooler 47. Particularly, air heated by cooling the supercharger 45 which is located forwardly of the intercooler 47 and generates intense heat is effectively prevented from flowing to the intercooler 47, whereby the cooling efficiency of the intercooler 47 is enhanced. Further, the intercooler 47 is physically isolated from the supercharger 45 by the left side wall AGc of the air guide AG, which suppresses the influence of radiant heat from the supercharger 45 as well. Further, the intercooler 47 is physically separated from the exhaust muffler 50 by the heat insulating plate 59, which suppresses the influence of radiant heat from the exhaust muffler 50 as well.

What is more, as described hereinabove, the battery 51 is located rearwardly of the intercooler 47, i.e. downstream of the same in the flow path STA (on an extension therefrom), and at the same time, the flow path STA is surely formed. Further, with the guide of the heat insulating plate 59, the air having cooled the intercooler 47 efficiently flows toward the battery 51. These configurations make the battery 51, which should not be exposed to intense heat, less prone to being influenced by heat sources in the flow paths STB and STC.

By the way, insofar as only the intercooler 47 is to be cooled, it suffices that the flow path STA is surely formed. Then, perfect partitioning between the flow paths STB and STC is not required, and some mixing of air between them may be allowed.

As described above, according to the present embodiment, in addition to and separately from the air inlet port HL1 for taking in cooling air for the supercharger 45 disposed forwardly of the engine 2, the air inlet port HR1 is provided for taking in cooling air for the intercooler 47, which makes it possible to efficiently cool the intercooler 47. Further, with the provision of the air guide AG, cold or cool air is directly guided to the intercooler 47, and at the same time, the flow path STA is positively partitioned from the flow paths STB and STC. This makes it possible to reduce the influence of heat sources, such as the supercharger 45, the exhaust muffler 50, and the clutch mechanism 38 upon the intercooler 47, to thereby enhance the cooling efficiency of the intercooler 47.

Further, the intercooler 47 is held in a position in which the cross-sectional area thereof along the plane perpendicular to the flow path STA becomes maximum, which makes it possible to maximize the cooling efficiency of the intercooler 47.

Further, the battery 51 is disposed in the flow path STA, and at the same time, the main heat sources of the supercharger 45, the exhaust muffler 50, and the clutch mechanism 38 are disposed outside the flow path STA. This makes it possible to reduce the influence of the heat sources, such as the supercharger 45 upon the battery 51 as well, to thereby prevent the battery 51 from being heated to a high temperature.

Moreover, according to the present embodiment, it is configured such that air is exhausted through the air exhaust ports EXL and EXR toward the running boards 23L and 23R. This simple configuration enables making effective use of air warmed in the engine room 30, whereby the running boards 23 can be prevented from being frozen so as to reduce the danger of slippage of the driver's foot off the running board.

Although in the present embodiment, the air guide AG is shaped with a generally rectangular transverse cross-section, this is not limitative, but it may have any shape, e.g. a hollow cylindrical shape, insofar as it can efficiently guide the incoming air stream 53 from the air inlet port HR1 to the intercooler 47.

In the present embodiment, the air guide AG having the walls AGa to AGd is provided for partitioning the air flow path STA from the air flow paths STB and STC, so that the air inlet port HR1, the air exhaust port EXR, and the air guide AG constitute an air flow path-forming mechanism for forming the air flow path STA. However, the air guide AG is not essential to rough formation of the air flow path STA. That is, from the viewpoint of separately cooling the intercooler 47 and the supercharger 45 while preventing them from adversely affecting each other, there can be another choice of employing a construction in which at least the left-side wall AGc is provided.

Although in the present embodiment, the air exhaust ports EXL and EXR are separately provided at left and right locations of the rear end of the engine room 30 in a manner associated with the air inlet ports HR1 and HL1, respectively, to make the flow paths STA and STB easy to be formed independently of each other, this is not limitative, but from the viewpoint of partitioning the flow paths, the locations of the air exhaust ports EXL and EXR are not limited to the illustrated example, insofar as the air flow paths STA and STB are positively separated from each other.

Although in the present embodiment, the air guide AG is formed integrally with the engine hood 29 to simplify the construction, this is not limitative, but from the viewpoint of laying much importance on forming desired air flow paths, at least one of the walls AGa to AGd, or part of each wall may be formed as a separate member from the engine hood 29.

The configuration in which the air guide AG or some of the walls thereof are provided can be applied not only to the intercooler 47 but also to other component parts for which cooling effects are desired to be preferentially provided. Further, the construction in which a plurality of flow paths, e.g. the flow paths STA and STB are partitioned from one another is not limited to the illustrated example, and there can be various variations in the design of the interior of the engine room 30, depending on which components parts are to be disposed in which flow paths.

Although in the present embodiment, it is configured such that the exhaust air streams 58 and 57 are always blown against the running boards 23L and 23R, this is not always essential, and it may be desirably configured such that the directions of exhausting air through the air exhaust ports EXL and EXR can be switched over such that the exhaust air streams 58 and 57 are not blown against the running boards 23R and 23L.

What is claimed is:

1. A snow vehicle comprising:
a vehicle body having a front part;
an engine hood provided at the front part of said vehicle body;
an engine room formed under or below said engine hood;
a four-cycle engine accommodated in said engine room;
a supercharger disposed in said engine room at a location forward of said four-cycle engine;
an intercooler for cooling air supplied from said supercharger to said four-cycle engine;
a first air inlet port formed through said engine hood, which takes in air for cooling said supercharger;
a second air inlet port formed through said engine hood separately from said first air inlet port, which takes in air for cooling said intercooler; and
a partition,
wherein a first air flow path formed through said engine room such that the air taken in through said first air inlet port flows therein and a second air flow path formed through said engine room such that the air taken in through said second air inlet port flows therein are substantially partitioned by said partition.

2. The snow vehicle as defined by claim 1, further comprising a guide which guides the air taken in through said second air inlet port to said intercooler.

3. The snow vehicle as defined by claim 2, wherein at least part of said guide is formed integrally with said engine hood.

4. The snow vehicle as defined by claim 1, further comprising a first air exhaust port which expels mainly the air taken in through said first air inlet port, and a second air exhaust port which expels mainly the air taken in through said second air inlet port, and wherein said engine room has a rear end, and said first air exhaust port and said second air exhaust port are disposed separately from each other at or in a vicinity of the rear end of said engine room.

5. The snow vehicle as defined by claim 4, wherein said vehicle body has left and right sides opposite to each other in a transverse direction thereof, and
the snow vehicle further comprising left and right running boards disposed at said left and right sides of said vehicle body, respectively, and
wherein said first and second air exhaust ports are directed toward said left and right running boards, respectively, such that air is expelled through said first and second air exhaust ports toward said left and right running boards, respectively.

6. The snow vehicle as defined by claim 1, wherein said intercooler is held in a position in which said intercooler has a maximum cross-sectional area along a plane perpendicular to said second air flow path.

7. The snow vehicle as defined by claim 1, further comprising a battery disposed in the second air flow path at a location downstream of said intercooler.

* * * * *